United States Patent [19]
Kot

[11] Patent Number: 6,138,291
[45] Date of Patent: Oct. 31, 2000

[54] TOILET WASTE AGITATING MECHANISM

[76] Inventor: Joseph F. Kot, 1485 W. Barron Rd., Howell, Mich. 48843

[21] Appl. No.: 09/335,963

[22] Filed: Jun. 18, 1999

[51] Int. Cl.[7] .................................................. A47K 11/02
[52] U.S. Cl. ............................... 4/319; 4/449; 4/DIG. 12
[58] Field of Search .............................. 4/319, 321, 462, 4/463, 449, DIG. 12, 405, 406, 313, 411

[56] References Cited

U.S. PATENT DOCUMENTS

| | | | |
|---|---|---|---|
| 1,005,075 | 10/1911 | Rosenstock | 4/319 |
| 1,461,612 | 7/1923 | Geibel | 4/319 |
| 1,732,775 | 10/1929 | Shaver | 4/319 |
| 2,435,845 | 2/1948 | Rice | 4/319 |
| 3,056,143 | 10/1962 | Foster | 4/313 |
| 3,776,383 | 12/1973 | Hargraves | 4/DIG. 12 |
| 3,859,672 | 1/1975 | Modig | 4/DIG. 12 |
| 4,131,959 | 1/1979 | Albertassi et al. | 4/319 |
| 4,240,164 | 12/1980 | Lind | 4/449 |
| 4,364,130 | 12/1982 | Persson | 4/449 |
| 4,663,045 | 5/1987 | Yeagley | 4/DIG. 12 |
| 5,289,595 | 3/1994 | Roche | 4/DIG. 12 |
| 5,345,620 | 9/1994 | Sundberg | 4/DIG. 12 |

FOREIGN PATENT DOCUMENTS

| | | | |
|---|---|---|---|
| 46964 | 2/1933 | Denmark | 4/449 |

Primary Examiner—Charles R. Eloshway
Attorney, Agent, or Firm—Charles W. Chandler

[57] ABSTRACT

An outdoor toilet system is provided with a mechanism for agitating solid waste material accumulating in a collection container, to reduce the volume of material. The agitator mechanism has a linkage connected to the door of the enclosure in which the toilet is located, such that the agitator mechanism is operated each time the door is opened and closed. The agitator mechanism can be a mechanical agitator or an air jet mechanism.

6 Claims, 6 Drawing Sheets

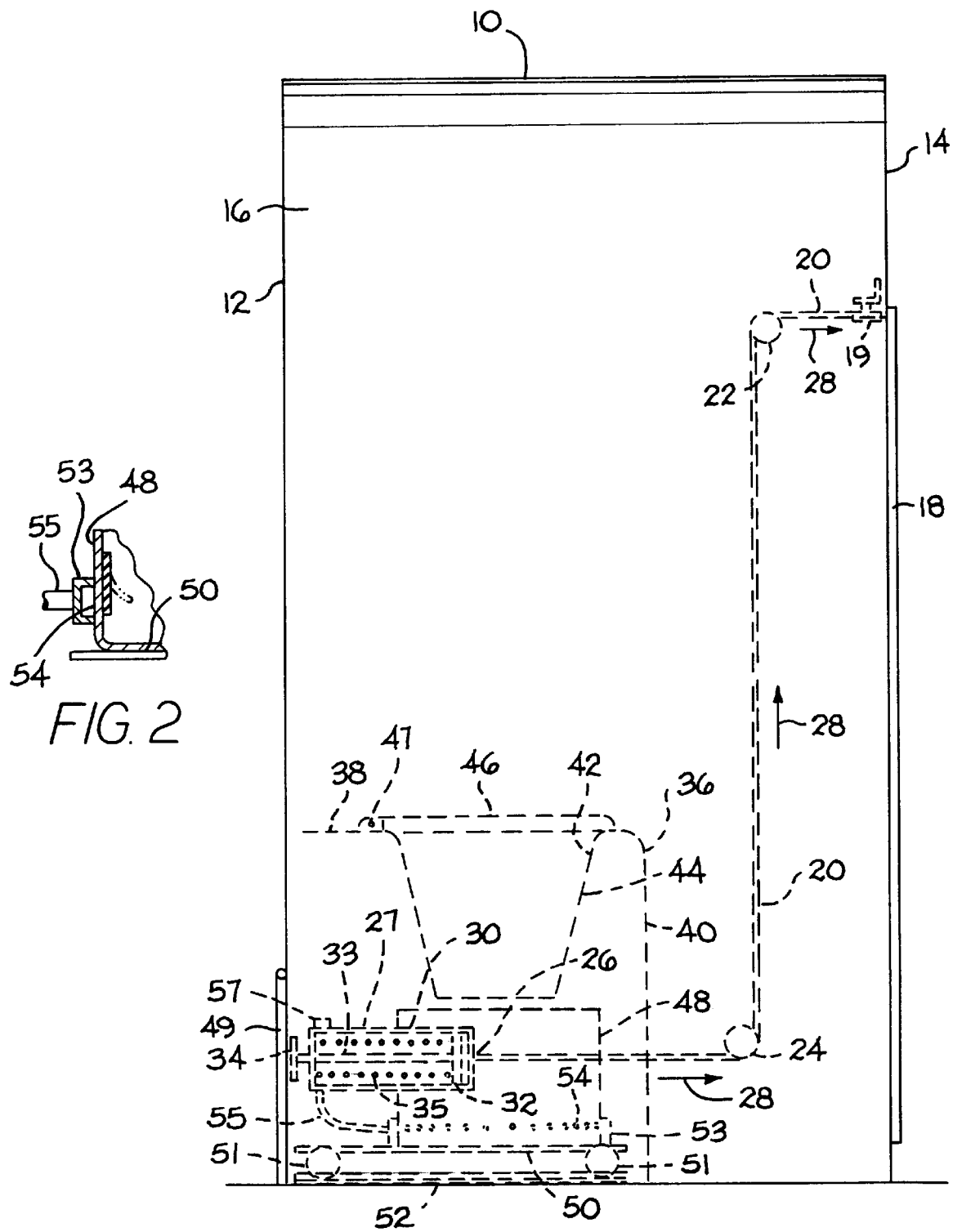

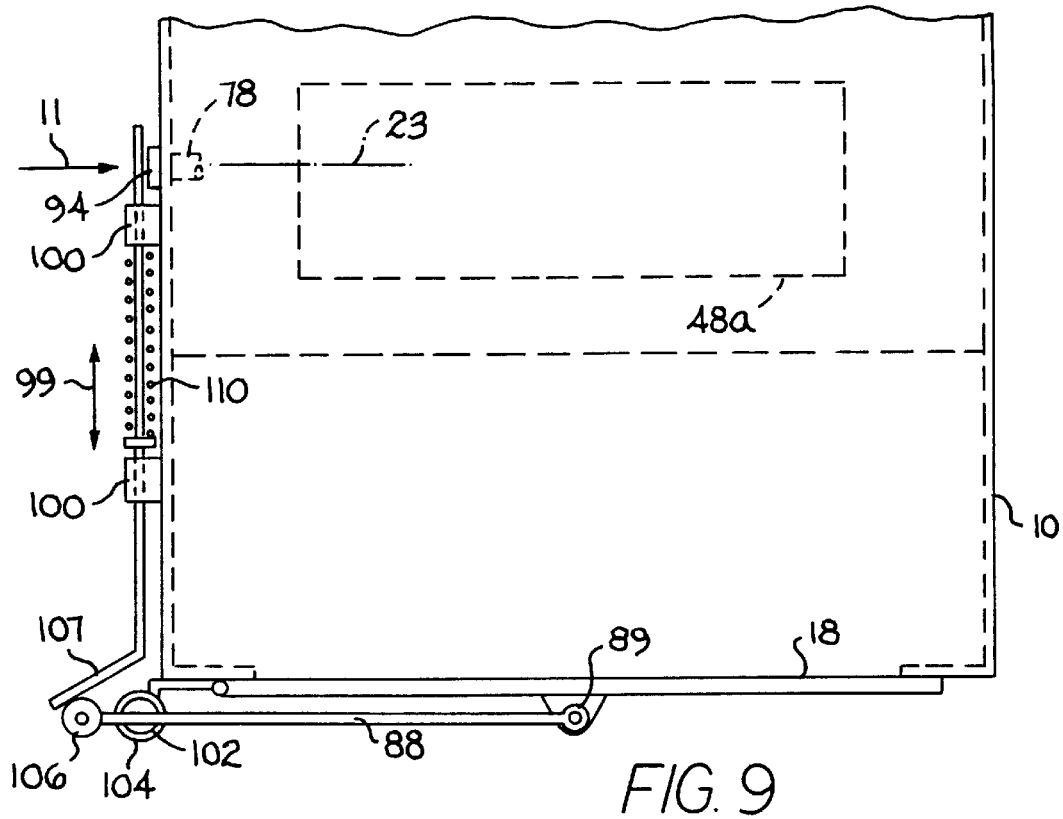
FIG. 9
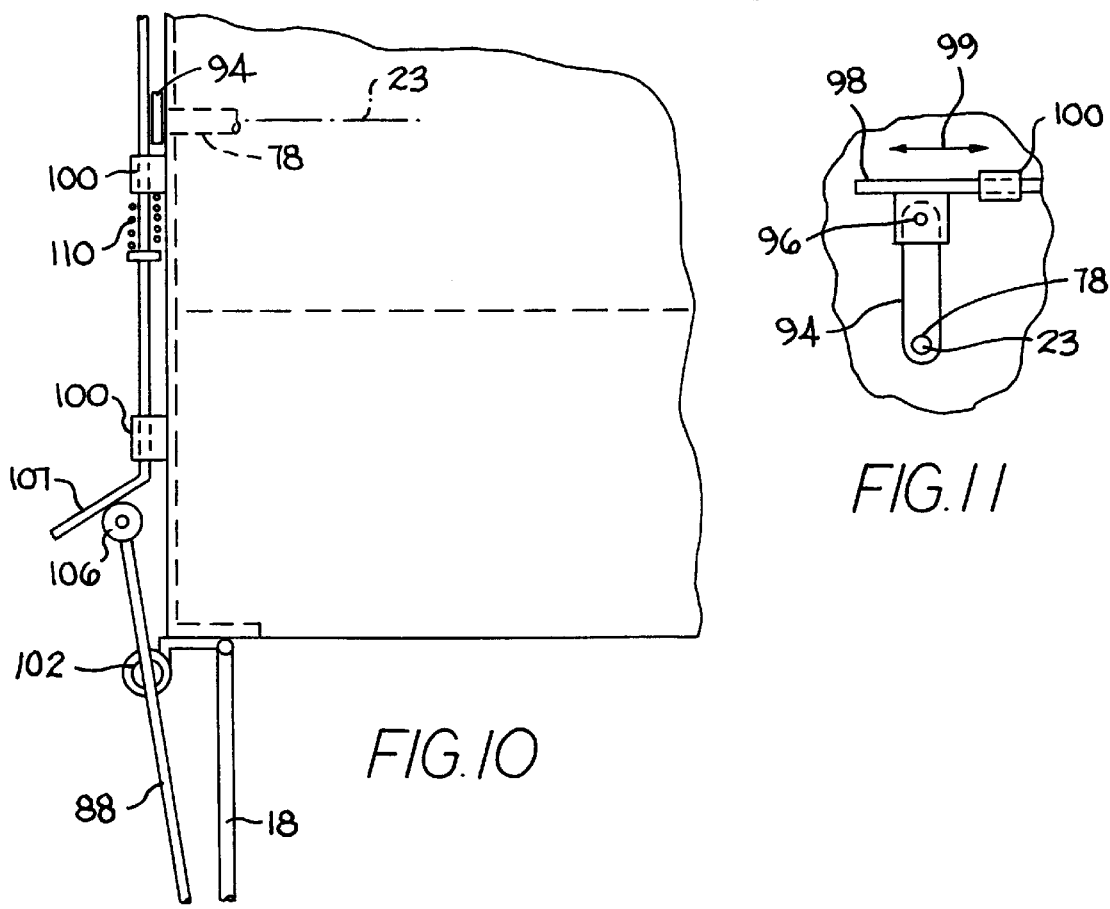
FIG. 10
FIG. 11

# TOILET WASTE AGITATING MECHANISM

BACKGROUND AND SUMMARY OF THE INVENTION

This invention relates to an outdoor toilet system, and particularly to a toilet system having an agitator mechanism for agitating solid waste that accumulates in a collection container within the toilet.

Toilet systems having solid waste agitators are shown in U.S. Pat. No. 4,131,959 to James Albertassi and Walter O. Heinze on Jan. 2, 1979 for "Non-Polluting toilet System"; U.S. Pat. No. 4,240,164 to John H. Lind on Dec. 23, 1980 for "Device in a Toilet for Biological Degradation of Excrement"; and U.S. Pat. No. 4,364,130 to Nils C. Persson on Dec. 21, 1982 for "Container for Decomposable Material such as Excrement". The present invention concerns a toilet system wherein the agitator mechanism for solid waste material is controlled by movement of an access door for the enclosure in which the toilet is located. This feature eliminates the requirement for positive physical operation of the agitator by the toilet user. Operation of the agitator mechanism is automatic.

Agitation of solid waste material in an outdoor toilet system is advantageous in that the apparent volume of a given mass of waste material is considerably reduced, such that the toilet system can accommodate a greater quantity of solid waste before required maintenance of the facility. Also, the agitation of the solid waste material hastens the chemical decomposition of the waste material by the disinfectant solution in the waste container, and reduces the air polluting effects of exposed feces.

In the preferred practice of the invention, the agitator mechanism is connected to an access door of the toilet enclosure by means of a force transmitting linkage. Each time the door is opened and closed, the linkage operates the agitator mechanism. The linkage can take various forms. In one illustrative arrangement, the linkage comprises a flexible cable trained around pulleys located within the toilet enclosure, so that one end of the cable is connected to the door and the other end of the cable is operatively connected to the agitator mechanism.

The agitator mechanism can take various forms. In one contemplated arrangement the agitator mechanism comprises a horizontal axis agitator having multiple agitator blades that move along a cylindrical bottom surface of the waste container, so that the blades stir solid waste material residing on the bottom surface.

In another form of the invention, the agitator mechanism comprises an air pump operated by the door-connected linkage. Compressed air generated by the air pump flows through a flexible air tube into an annular channel encircling the waste container. The annular channel has plural ports communicating with the container interior space at spaced locations along the channel, whereby jets of air can be simultaneously directed into the container to stir solid waste in the container.

Further features of the invention will be apparent from the attached drawings and description of illustrative embodiments of the invention.

BRIEF DESCRIPTION OF THE DRAWINGS

FIG. 1 is a side elevation view of an enclosure in which is located a toilet system embodying the invention.

FIG. 2 is a fragmentary sectional view showing a structural detail employed in the FIG. 1 construction.

FIG. 9 is a fragmentary top plan view of another enclosure equipped with a mechanism embodying the invention.

FIG. 10 is a view taken in the same direction as FIG. 9, but showing the access door for the enclosure in an open position.

FIG. 11 is a fragmentary view of a structural detail employed in the FIG. 9 embodiment. FIG. 11 is taken in the direction of arrow 11 in FIG. 9.

DESCRIPTION OF A PREFERRED EMBODIMENT OF THE INVENTION

Figure 3:
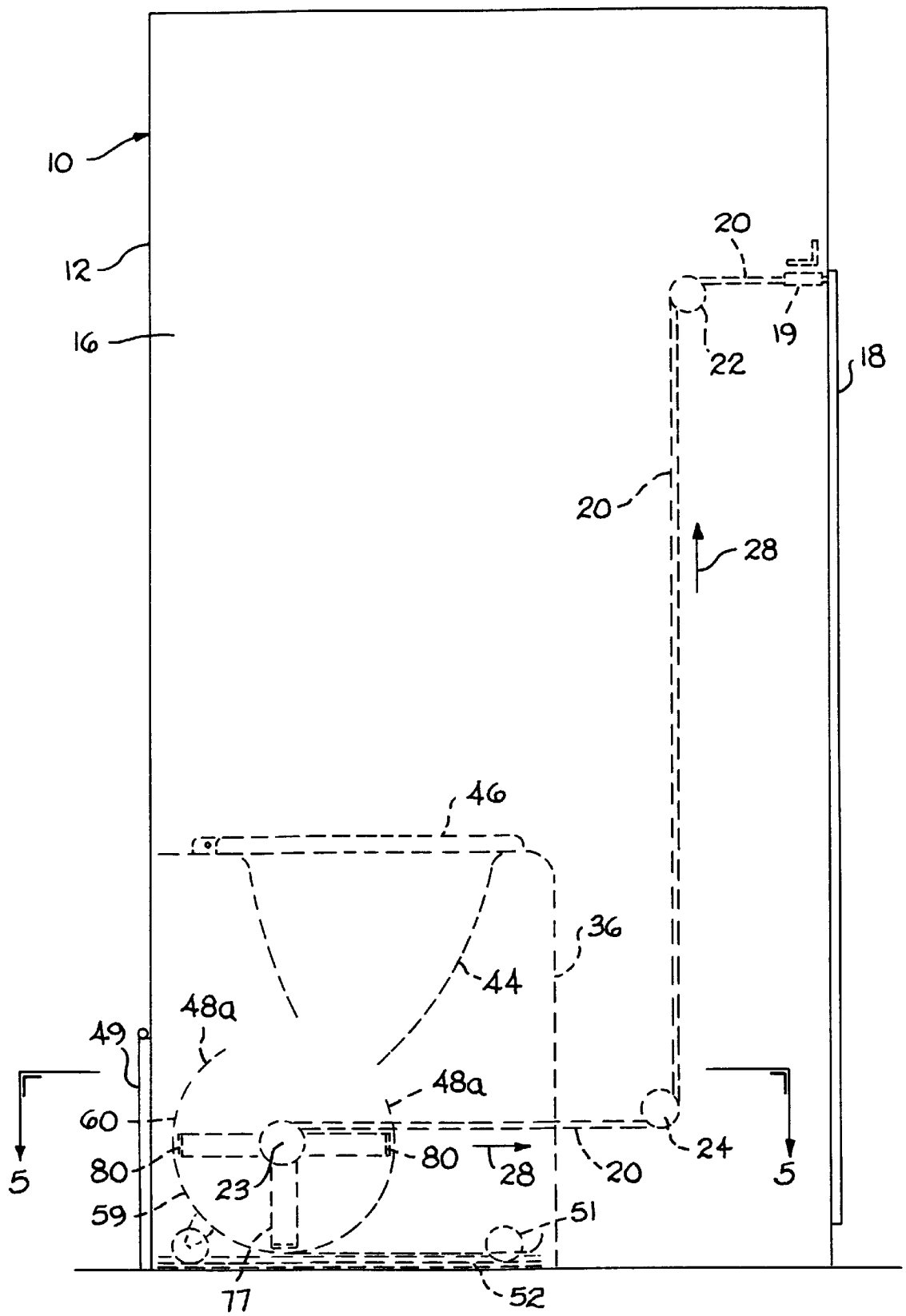
FIG. 3 is a view, taken in the same direction as FIG. 1, but showing an enclosure having a second embodiment of the invention therein.

FIG. 1 shows an outdoor toilet system of the present invention. As shown, the toilet system comprises an outdoor enclosure 10 having a rear wall 12, a front wall 14, and two sidewalls. One of the sidewalls is referenced by numeral 16 in FIG. 1.

Front wall 14 has a rectangular human access opening that is normally closed by an outwardly swingable access door 18. Two vertical axis pulleys 19 are mounted on the enclosure front wall 14 near the upper corners of the access opening. A flexible cable 20 has one end connected to an upper corner area of the door near the moveable edge of the door (i.e. the door vertical edge remote from the door hinges).

Cable 20 extends horizontally around pulleys 19, 19, then around a horizontal axis pulley 22, downwardly around a second horizontal axis pulley 24, and horizontally to a connection 26 with an air pump 27. Pulleys 22 and 24 can be mounted on enclosure sidewall 16.

Figure 4:
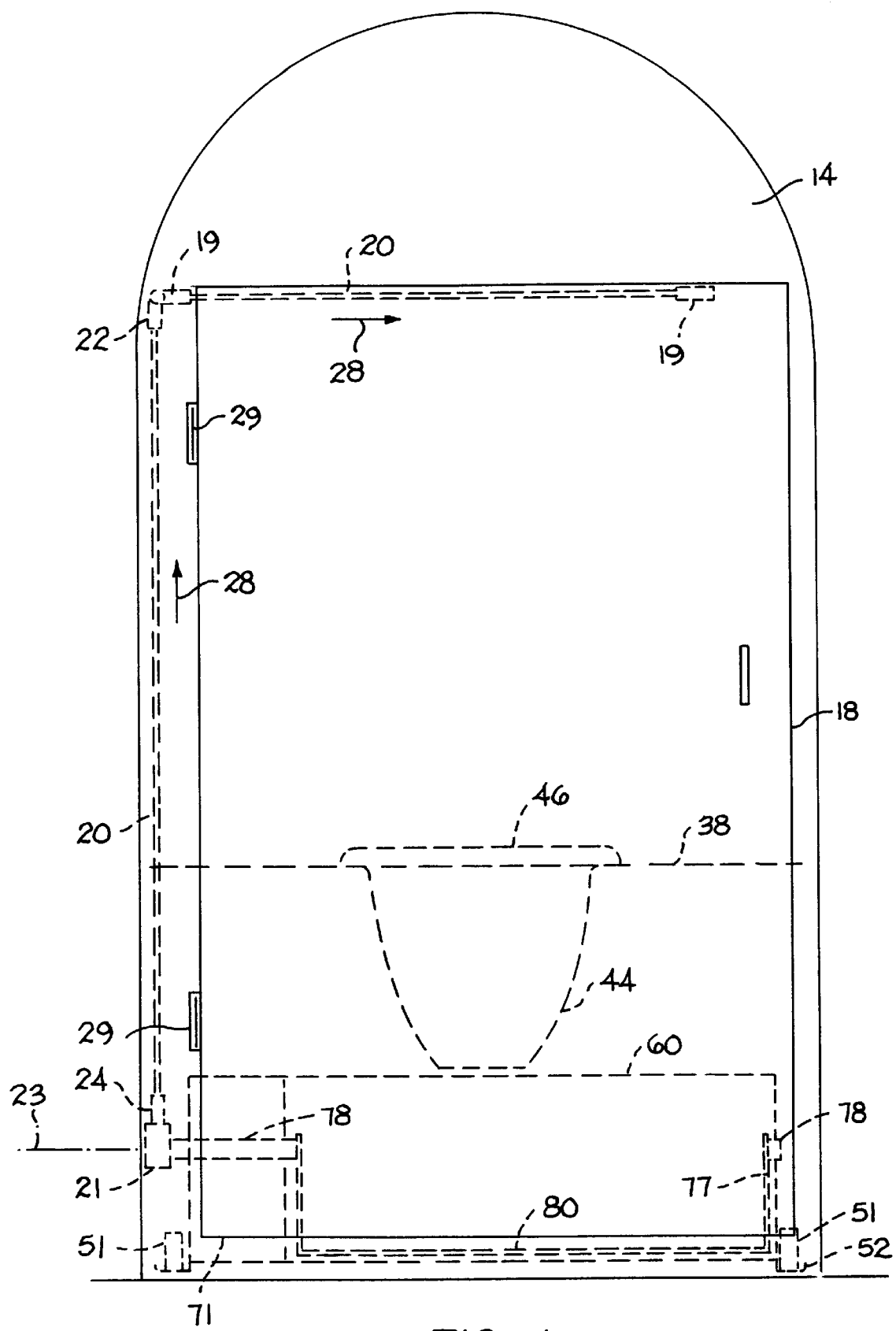
FIG. 4 is a front elevational view of the enclosure depicted in FIG. 3.

The horizontal spacing between pulleys 19, 19 is similar to the pulley spacing shown in FIG. 4. In each case, the cable undergoes a ninety-degree turn as it extends around a given pulley. Still referring to FIG. 3, swinging movement of access door 18 around hinge connections 29 produces a pulling force on cable 20, as indicated by arrows 28. A similar action takes place when the door is opened.

Referring again to FIG. 1, air pump 27 comprises an air cylinder 30 slidably mounted on a piston 32 carried on a piston rod 33. The left end of rod 33 is anchored to a bracket 34 that extends from sidewall 16 of the enclosure. A compression coil spring 35 is trained between the end wall of air cylinder 30 and piston 32, so that cylinder 30 automatically moves to the FIG. 1 position when access door 18 is in the closed position.

Air pump 27 is located alongside enclosure sidewall 16 within a toilet housing 36. As shown in FIG. 1, the toilet housing comprises a horizontal top wall (or seat) 38 and a vertical wall 40 extending from wall 38 to the floor of the enclosure. Walls 28 and 40 span the entire space between the sidewalls of enclosure 10.

Wall 38 has an oval-shaped opening 42 that communicates with a funnel-shaped bowl 44. Opening 42 is normally closed by a cover 46 that has a hinge connection 47 with the toilet top wall 38. Bowl 44 is optional; opening 42 can be used without the bowl, if desired.

Solid and liquid waste material generated by use of toilet 36 is collected in cylindrical container 48 located below bowl 44. The container can be filled about half full with a liquid disinfectant to achieve at least partial decomposition of solid waste material accumulating in the container. Container 48 can be removed from toilet 36 through an access opening in rear wall 12 normally closed by a hinged cover 49.

Container 48 can be positioned on a rectangular platform (or tray) 50 that has support wheels 51 at its four corners. Parallel tracks 52 on the floor of enclosure 10 guide the wheels in parallel paths when platform 50 is moved through the opening normally closed by cover 49.

The invention is particularly concerned with means responsive to movement of door 18 for agitating the solid waste material accumulating in cylindrical container 48. The agitating means comprises a channel 53 attached to the container sidewall so as to entirely encircle the container. The channel has plural ports 54 extending through the container sidewall to communicate with the container interior space. Ports 54 may be evenly spaced along the entire length of channel 53.

Air cylinder 30 has an air discharge port detachably connected to one end of a flexible air tube 55. The other end of tube 55 connects to channel 53. Air is supplied to cylinder 30 through a check valve 57.

When door 18 is swung open (e.g. by a person entering the enclosure), cable 20 is moved in the arrow 28 direction, thereby moving air cylinder 30 rightwardly so that air in the cylinder is compressed and moved through tube 55 into channel 53. The pressurized air is exhausted out of channel 53 into the container interior space through ports 54, thereby agitating solid waste material in the container. The waste material is agitated to form smaller particulates.

When door 18 is swung to the closed position, spring 35 returns air cylinder 27 to the FIG. 1 position; cable 20 remains in a taut condition. Fresh air is admitted to cylinder 27 through check valve 57. The cycle is repeated each time a person enters or leaves enclosure 10.

Figure 5:
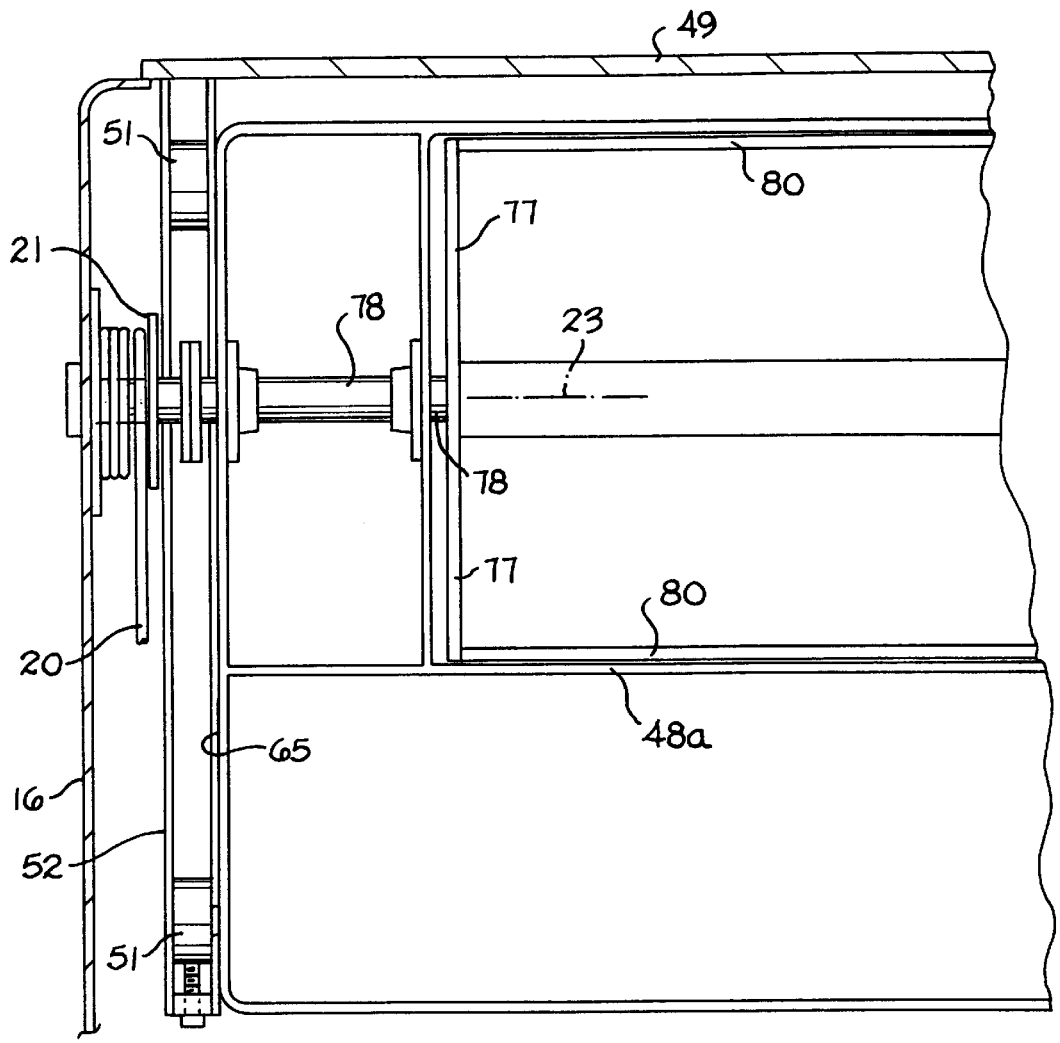
FIG. 5 is a fragmentary sectional view taken on line 5—5 in FIG. 3.

FIGS. 3 through 5 illustrate another form that the invention can take. In this case, the agitating mechanism comprises a horizontal axis rotary agitator supported on the end walls of a cylindrical waste collection container, whereby blades on the agitator move along a cylindrical bottom wall of the container to stir solid waste material in the container. As in the previously described embodiment, the agitator is operated automatically by movement of door 18.

In the FIG. 3 toilet system, liquid disinfectant is contained in a trough-like container 48a having a cylindrical bottom wall 59. The container forms part of a larger unit 60 spanning substantially the entire space between the enclosure sidewalls. Wheels 51 at the corners of unit 60 support the unit for movement into or out of the space circumscribed by toilet housing 36. The overall mobility features are similar to those used in the FIG. 1 embodiment.

One end of cable 20 is connected to door 18; the other end of cable 20 is wound around a reel 21 that is rotatably mounted on the enclosure side wall 16 for rotation around a transverse horizontal axis 23. A spring means within the reel biases the reel in a counterclockwise direction (as viewed in FIG. 2), whereby cable 20 remains in a taut condition during swinging movement of access door 18. When door 18 is swung open, reel 21 rotates in a clockwise direction (in FIG. 2); when door is swung to the closed position, reel 21 rotates in a counterclockwise direction.

The output shaft 62 of reel 21 is detachably connected to the input shaft 78 of an agitator mechanism 63 located within container 48a.

The mechanism for agitating solid waste material in container 48a includes two sets of spokes 77 having aligned stub shafts 78 extending through bearings at opposite ends of container 48a; shafts 78 can be coaxial with the reel 23 axis. One of the shafts 78 is detachably connected to the reel output shaft 62.

In the illustrated arrangement, reel 21 drives the agitator; however, a speed increaser could be interposed between the reel and the agitator to improve performance. As shown in FIG. 3, the agitator comprises three cutter blades 80 extending between the two spoke sets, for movement around the agitator rotational axis 23. The cylindrical bottom wall of container 48a is centered on axis 23 so that when the agitator is in operation, blades 80 move along wall 49 to stir solid waste material in container 48a.

The agitator moves in one direction during opening movement of door 18, and in the opposite direction during closing movement of the door. The spring mechanism in reel 21 operates the agitator while the door is moving in the closing direction.

Figure 6:
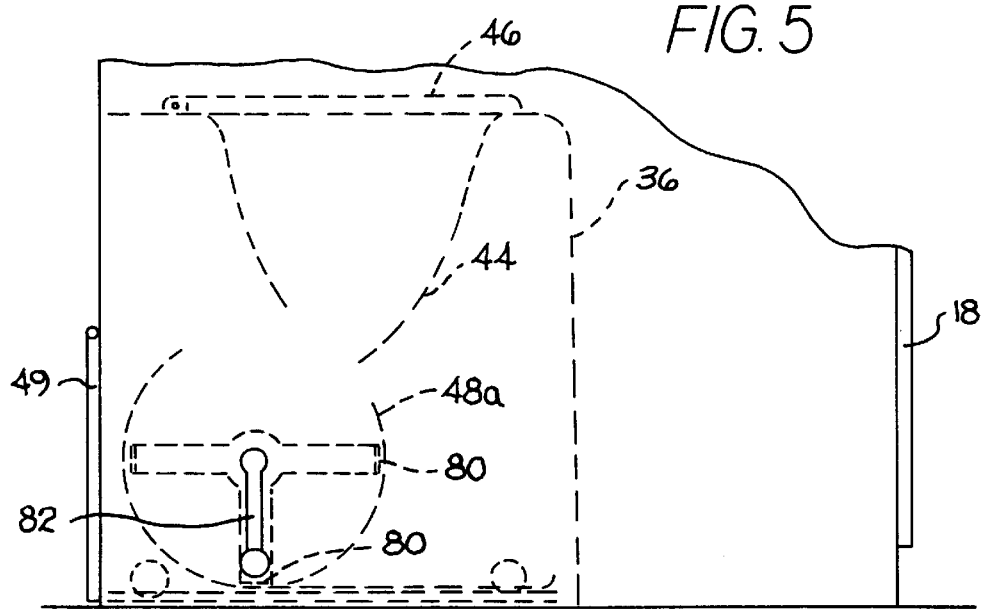
FIG. 6 is a fragmentary view taken in the same direction s FIG. 3, but showing another manual waste material agitator mechanism employing features of the invention.

FIG. 6 shows an arrangement that is generally similar to the FIG. 3 arrangement except that the agitator is operated by a manual crank 82 attached to a rotary shaft that extends through the enclosure side wall 16. The FIG. 6 construction does not include reel 21 or cable 20. Operation of pump 66 and the agitator is accomplished by manual rotation of hand crank 82.

Figure 7:
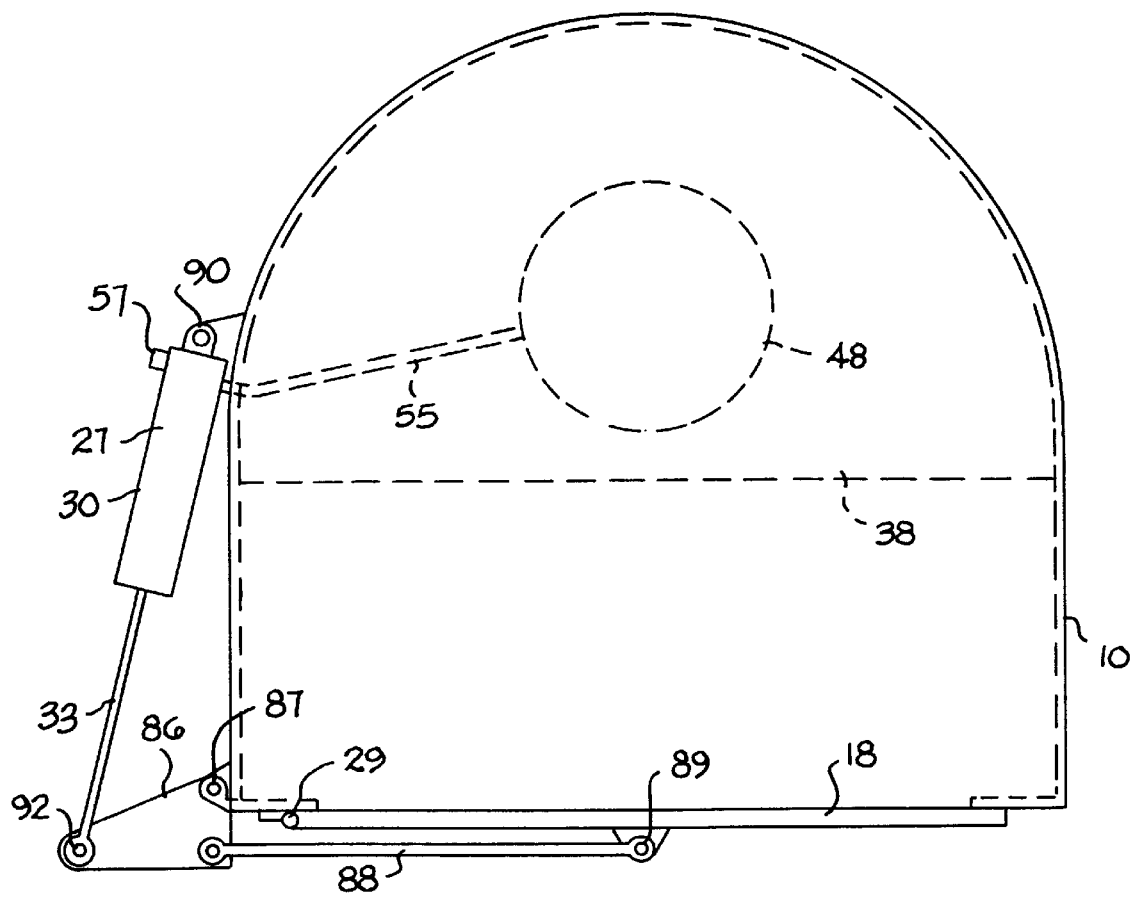
FIG. 7 is a top plan view of an enclosure having a further embodiment of the invention associated therewith.
Figure 8:
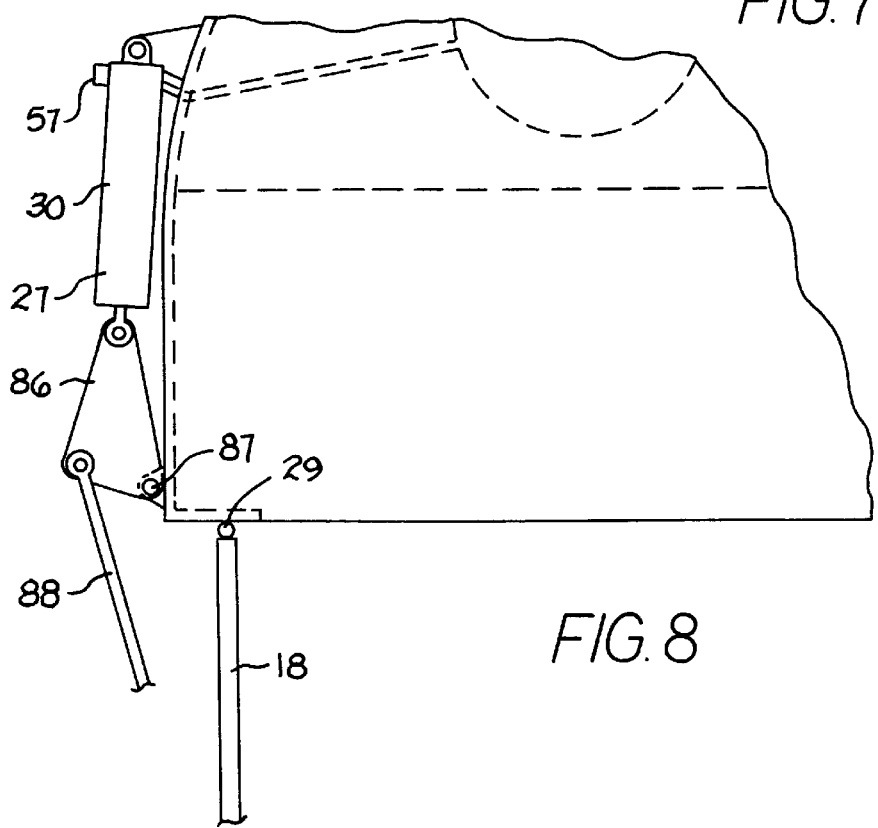
FIG. 8 is a fragmentary view taken in the same direction as FIG. 7, but showing the access door for the enclosure in an open position.

FIGS. 7 and 8 show another embodiment of the invention that uses compressed air to agitate solid waste in a container 48 located below the toilet opening. In this case, the air pump 27 is located along an exterior side surface of toilet enclosure 10.

Air pump 27 delivers pressurized air into a flexible air tube 55 that is operatively connected to container 48 in a generally similar fashion to the system employed in the embodiment of FIGS. 1 and 2.

FIG. 7 differs from FIG. 1 as regards the mechanism used to operate air pump 27. The pump-operating mechanism comprises a mechanical linkage operatively connecting the access door 18 to the air pump. This linkage includes a crank 86 having a pivotal connection 87 with a side wall of enclosure 10, and a link 88 extending between crank 86 and a pivot support means 89 on access door 18.

Cylinder 30 of air pump 27 has a pivotal attachment 90 on enclosure 10, while the piston rod 33 of the air pump has a pivotal connection 92 with crank 86. By comparing FIGS. 7 and 8, it will be seen that the linkage between access door 18 and air pump 27 operates the air pump in response to swinging motion of the access door.

As access door 18 is swung open from the FIG. 7 closed position, link 88 swings crank 86 in a clockwise direction around the axis of pivot connection 87. Crank 86 moves piston rod 33 into air cylinder 30, thereby pumping pressurized air through tube 55. Reverse motion of door 18 to the closed position allows new air to be admitted to cylinder 30 via check valve 57. In overall operation, the FIG. 7 system functions in generally the same fashion as the FIG. 1 system.

FIGS. 9 through 11 show a further embodiment of the invention that is generally similar to the embodiment shown in FIGS. 3 through 5, except for the mechanism used to operate the agitator. The agitator used in the FIG. 9 system may be similar to the agitator used in the FIG. 3 system.

In the FIG. 9 embodiment, agitator shaft 78 is operatively connected to a swingable arm 94 located alongside an outer side surface of enclosure 10. Arm 94 has a pin-slot connection 96 with a horizontal rod 98 that is mounted in guides 100 for slidable motion, as indicated by arrow 99 in FIGS. 9 and 11. Slidable motion of the rod causes arm 94 to swing around horizontal axis 23, thereby turning shaft 78 to operate the agitator located within container 48a.

Rod 98 is slidable in two aligned tubular guides 100 suitably mounted on an exterior side surface of toilet enclosure 10. The rod is moved between the FIG. 9 and FIG. 10 positions by means of a link 88 that is slidably supported in a rotary spindle 102 located within a stationary support sleeve 104; link 88 extends through a transverse hole in spindle 102, so that the link can slide through the spindle while being moved by the motion of access door 18. Link 88 can have a circular rod cross-section.

The left end of link 88 carries a roller 106 that is engaged with an angled plate 107 attached to the front end of rod 98. As access door 18 is swung from the FIG. 9 closed position, link 88 slides leftwardly through spindle 102, so that roller 106 exerts a pushing force on plate 107, thereby moving rod 98 in a rearward direction; such rod 98 movement causes arm 94 (FIG. 11) to operate the agitator in container 48a. Reverse motion of the access door 18 to the FIG. 9 closed position reverses the motion of the agitator in container 48a. A coil spring 110 can be used to keep plate 107 in operative contact with roller 106.

The system of FIGS. 9 through 11 is similar to the FIG. 3 system, except that a different type of linkage is used to operate the agitator. In both cases, the agitator is operated by means responsive to movement of access door 18.

Having described my invention, I claim:

1. An outdoor toilet system, comprising:

an outdoor enclosure having a swingable access door;

a toilet located within said enclosure; said toilet comprising a seat having a waste discharge opening;

a liquid and solid waste container located below said opening for receiving human waste;

means for agitating solid waste in said container;

means responsive to movement of the access door for operating said agitating means;

said container having a cylindrical bottom wall centered on a horizontal axis; said agitating means comprising a rotary agitator mounted for rotational movement around said horizontal axis; said rotary agitator having a blade means adapted to move along the cylindrical bottom wall of said container to stir solid waste in the container;

said door movement responsive means comprising a flexible cable and rotary reel operatively connected to said rotary agitator; said flexible cable having one end connected to said door and another end wound around said reel, whereby movement of the door rotates the reel and the agitator.

2. An outdoor toilet system, comprising:

an outdoor enclosure having a swingable access door;

a toilet located within said enclosure; said toilet comprising a seat having a waste discharge opening;

a liquid and solid waste container located below said opening for receiving human waste;

means for agitating solid waste in said container;

means responsive to movement of the access door for operating said agitating means, comprising:
      a flexible cable and pulley means for guiding said cable.

3. The outdoor toilet system of claim 2, wherein said pulley means comprises first and second vertical axis pulleys located along the upper edge of the access door, and third and fourth horizontal axis pulleys located on a side wall of the enclosure.

4. An outdoor toilet system, comprising:

an outdoor enclosure having a swingable access door;

a toilet located within said enclosure; said toilet comprising a seat having a waste discharge opening;

a liquid and solid waste container located below said opening for receiving human waste;

means for agitating solid waste in said container;

means responsive to movement of the access door for operating said agitating means, comprising a mechanical linkage connecting said door to said agitating means, said mechanical linkage comprising a horizontal rod mounted on said enclosure for slidable movement and a link having one end swingably joined to said door; said link having a roller operatively engaging said rod so that when said door is moved in the opening direction said link exerts a pushing force on said rod.

5. The outdoor toilet system of claim 4, wherein said agitating means comprises an air pump having a flexible air output tube for directing pressurized air into said container; said mechanical linkage comprising a crank means swingably mounted on said enclosure, a link having one end connected to said door and another end connected to said crank means; said air pump comprising a piston rod connected to said crank means whereby swinging motion of said crank means operates said air pump.

6. An outdoor toilet system, comprising:

an outdoor enclosure having a swingable access door;

a toilet located within said enclosure; said toilet comprising a seat having a waste discharge opening;

a liquid and solid waste container located below said opening for receiving human waste;

means for agitating solid waste in said container;

means responsive to movement of the access door for operating said agitating means;

said door movement-responsive means consisting of a mechanical linkage connecting said door to said agitating means.

\* \* \* \* \*